(12) United States Patent
Mann et al.

(10) Patent No.: US 7,992,886 B2
(45) Date of Patent: Aug. 9, 2011

(54) ARTICULATED FIFTH WHEEL SELECTIVE ADJUSTMENT MEANS

(75) Inventors: Steven W. Mann, Gardendale, AL (US); Gavin C. Trinosky, Birmingham, AL (US)

(73) Assignee: Fontaine Fifth Wheel Co., Trussville, AL (US)

( * ) Notice: Subject to any disclaimer, the term of this patent is extended or adjusted under 35 U.S.C. 154(b) by 389 days.

(21) Appl. No.: 12/334,979

(22) Filed: Dec. 15, 2008

(65) Prior Publication Data
US 2010/0148470 A1 Jun. 17, 2010

(51) Int. Cl.
*B62D 53/08* (2006.01)
*B62D 53/06* (2006.01)
(52) U.S. Cl. .................................. 280/438.1; 280/441
(58) Field of Classification Search .............. 280/438.1, 280/441, 441.1, 441.2, 901; 297/143, 341, 297/344.1
See application file for complete search history.

(56) References Cited

U.S. PATENT DOCUMENTS

| | | | | |
|---|---|---|---|---|
| 3,729,214 A * | 4/1973 | Mulcahy et al. | ............... | 280/407 |
| 3,893,710 A * | 7/1975 | Madura | .................... | 280/407 |
| 5,344,173 A * | 9/1994 | Beeler et al. | ............... | 280/438.1 |
| 7,108,274 B2 * | 9/2006 | Laarman | .................... | 280/438.1 |
| 7,699,334 B1 * | 4/2010 | Mann et al. | ................. | 280/407.1 |
| 7,717,451 B2 * | 5/2010 | Alguera | .................. | 280/438.1 |
| 7,874,569 B2 * | 1/2011 | Schmidt et al. | ............ | 280/438.1 |
| 2006/0202443 A1 * | 9/2006 | Sibley et al. | ................. | 280/441 |

* cited by examiner

*Primary Examiner* — Anne Marie Boehler
*Assistant Examiner* — Daniel Yeagley
(74) *Attorney, Agent, or Firm* — George P. Kobler; Lanier Ford Shaver & Payne, P.C.

(57) ABSTRACT

An articulated selective adjustment apparatus carried within the pedestal of a fifth wheel assembly comprises a mounting plate pivotally connected to a plunger arm configured for selective extension and withdrawal from the pedestal, and having ends to which are pivotally connected first and second prongs having interior ends disposed toward the pedestal that are pivotally connected to the mounting plate ends.

5 Claims, 4 Drawing Sheets

ARTICULATED FIFTH WHEEL SELECTIVE ADJUSTMENT MEANS

BRIEF DESCRIPTION OF THE DRAWINGS

The present invention is described with reference to the accompanying drawings. In the drawings, like reference numbers indicate identical or functionally similar elements.

DETAILED DESCRIPTION

The various embodiments of the present invention and their advantages are best understood by referring to FIGS. 1 through 7 of the drawings. The elements of the drawings are not necessarily to scale, emphasis instead being placed upon clearly illustrating the principles of the invention. Throughout the drawings, like numerals are used for like and corresponding parts of the various drawings.

The drawings represent and illustrate examples of the various embodiments of the invention, and not a limitation thereof. It will be apparent to those skilled in the art that various modifications and variations can be made in the present inventions without departing from the scope and spirit of the invention as described herein. For instance, features illustrated or described as part of one embodiment can be included in another embodiment to yield a still further embodiment. Moreover, variations in selection of materials and/or characteristics may be practiced to satisfy particular desired user criteria. Thus, it is intended that the present invention covers such modifications as come within the scope of the features and their equivalents.

Furthermore, reference in the specification to "an embodiment," "one embodiment," "various embodiments," or any variant thereof means that a particular feature or aspect of the invention described in conjunction with the particular embodiment is included in at least one embodiment of the present invention. Thus, the appearance of the phrases "in one embodiment," "in another embodiment," or variations thereof in various places throughout the specification are not necessarily all referring to its respective embodiment.

Terms such as "aft," "rear," "forward," "front," "lateral," "inboard" or "outboard," or the like, and variations or derivatives thereof, are to be understood in relation to the vehicle on which the fifth wheel is mounted. However, it is to be understood that the invention may assume various alternative orientations, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Figure 1A:
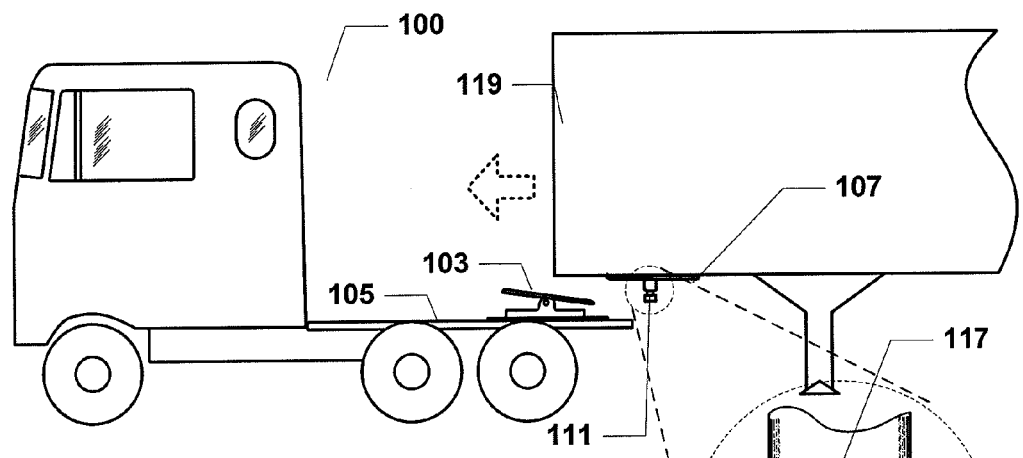
FIG. 1A is an exemplary tractor truck and trailer with a fifth wheel hitch.
Figure 1B:
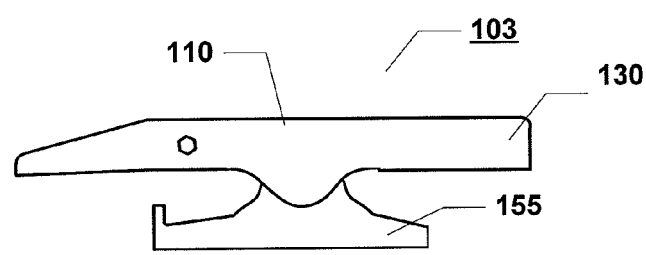
FIG. 1B is an exemplary fifth wheel hitch.
Figure 1C:
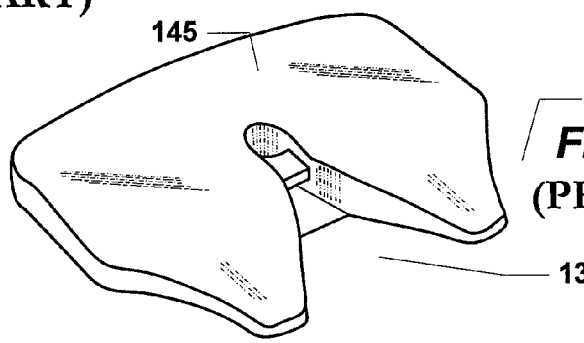
FIG. 1C is an exemplary hitch plate.

Referring to the Figures, fifth wheel hitches are well known in the field of towing trailers using a truck or tractor. FIGS. 1A through 1C depict an exemplary tractor and trailer hitch arrangement employing a fifth wheel hitch. Tractor 100 is affixed with a fifth wheel hitch 103 to rear of tractor frame 105. Fifth wheel hitch 103 includes a fifth wheel hitch assembly 110 pivotally mounted on pedestal 155. Fifth wheel hitch assembly 110 comprises hitch plate 130 which houses a locking mechanism underneath (shown and described in greater detail below) with slot 135 opening toward the aft end of fifth wheel assembly 110 for receiving a kingpin 11 from trailer 19.

Kingpin 111 typically extends downward from a trailer bearing plate 107, which rests upon fifth wheel assembly, specifically, upon load area 145 of fifth wheel hitch plate 130. Kingpin is, typically, a unitarily constructed article comprised of a lower flange 115 capping a shank 113 which extends from collar 117.

Figure 1D:
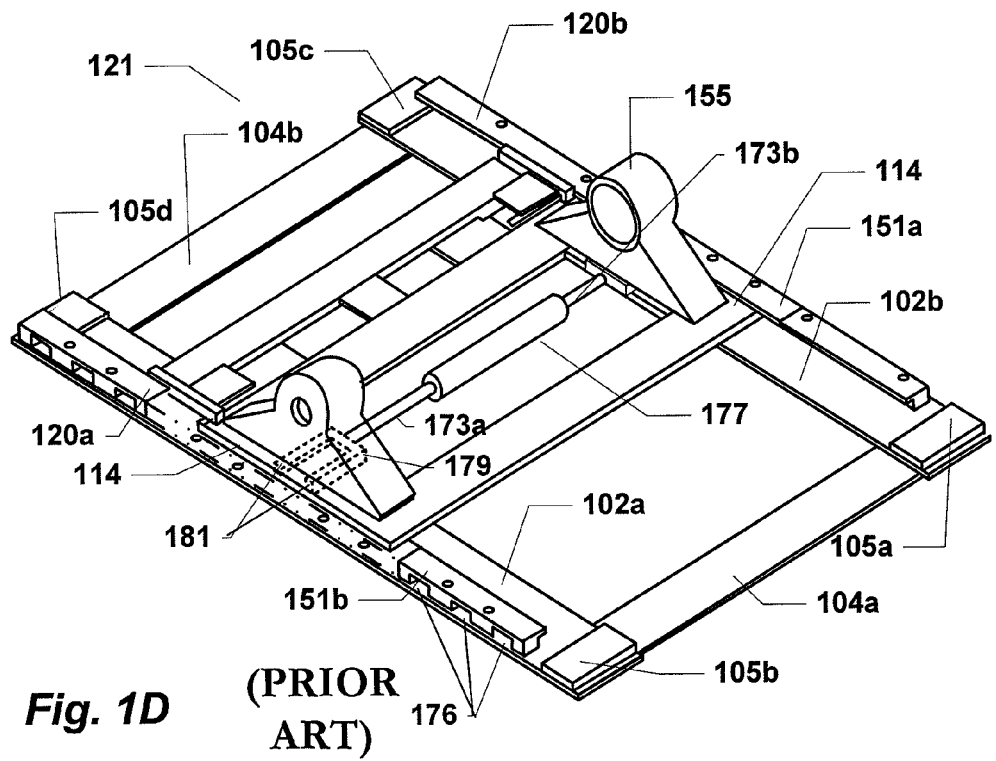
FIG. 1D is an exemplary prior art fifth wheel slide rail assembly.

FIG. 1D depicts an example of the prior art slide rail where slide rail assembly 120a is comprised of left and right slide rail plates 102a, b tied in parallel by two or more tie bars 104a, b which form slide frame 121. Left slide rail 151a is attached to the upper surface of left slide rail plate 102a and right slide rail 151a is attached to upper surface of right slide rail plate 102b such that fifth wheel hitch assembly 110 and pedestal 155 are located therebetween, inboard of the left and right slide rails 151a, b. Slide rail plates 102a, b and slide rails 151a, b each have longitudinal axes which parallel the longitudinal axis of tractor 100. Slide stop blocks 105a-d are located at each end of each slide rail plate 102a, b. Slide stop blocks 105a-d prevent over travel of pedestal 155. As is shown in the illustration, slide rails 151a, b of the prior art are typically a flange extending inboard of the assembly, slidably receiving flanges 114 of pedestal 155. Slide rails 151 a, b typically include gaps, or detents, 176 spaced along the length of the slide rail.

The pedestal 155 may include a means for selectively locking the pedestal in position longitudinally with respect to the slide rail assembly. One example, shown in FIG. 1D, is a pneumatic cylinder 177 mounted in the pedestal from which laterally extend plunger arms 173a, b. A wedge 179 is typically mounted to the respective lateral ends of plunger arms 173, where each wedge includes one or more projections, or prongs, 181 that insert into the slide rail gaps 176 when the plungers arms are extended. The engagement of the projections 181 into the gaps 176, thus, prevents longitudinal movement of the pedestal, and, therefore, the fifth wheel assembly. The wedges may be withdrawn and the pedestal moved along the slide rail assembly to a different desired position, and the fork members extended again to different gaps in the slide rails.

Figure 3:
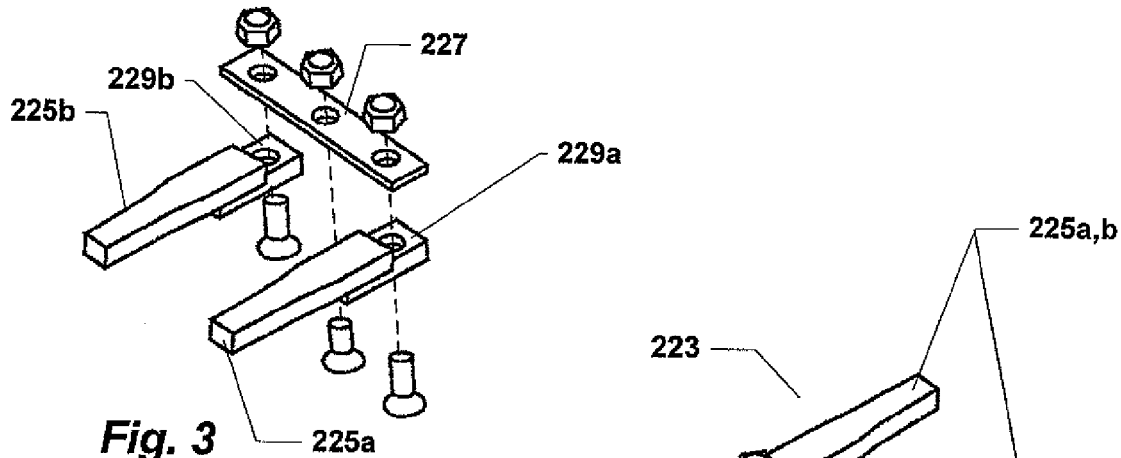
FIG. 3 depicts an exploded view of the articulated prong assembly.
Figure 2:
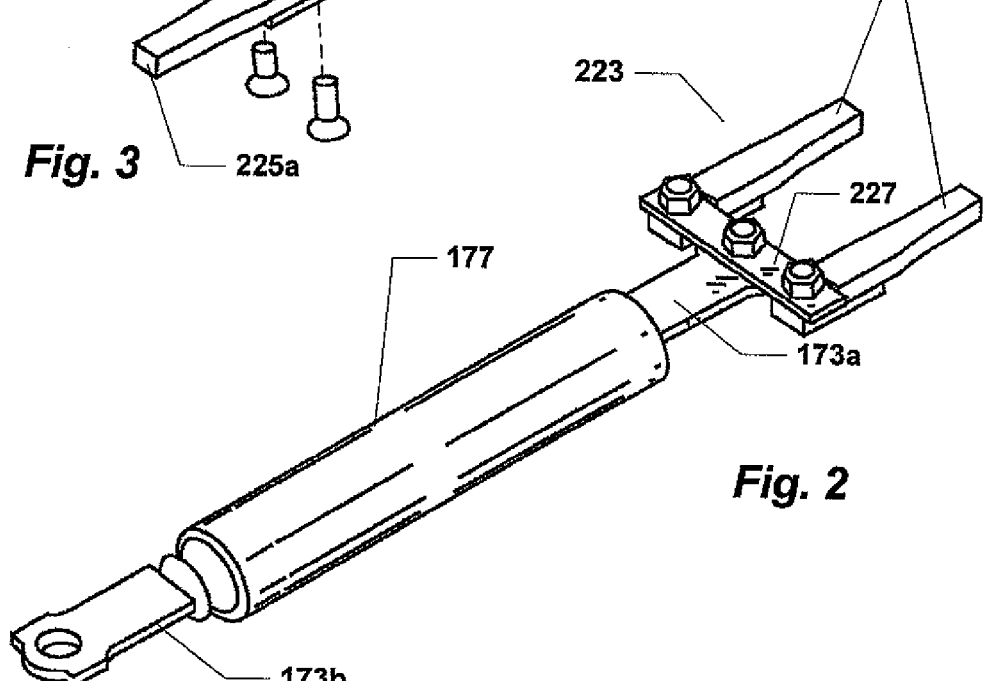
FIG. 2 depicts an exemplary cylinder and plunger arm with a wedge assembly according to an embodiment of the present invention.
Figure 4:
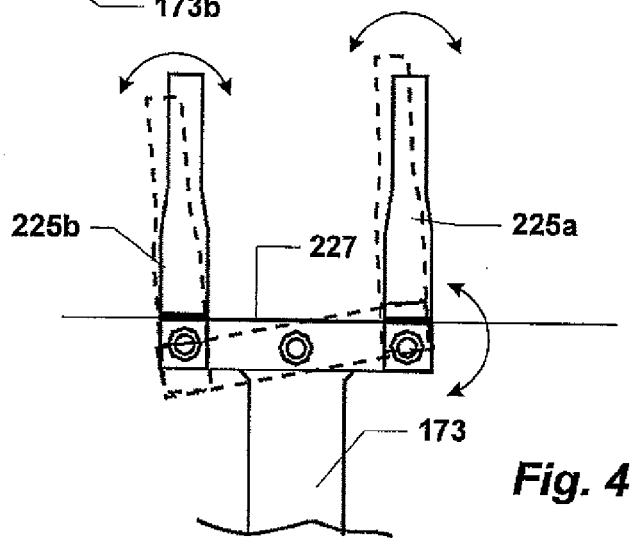
FIG. 4 is an illustrative plan view of an exemplary articulated prong assembly.

FIG. 2 depicts an embodiment of the present invention intended to be incorporated into a pedestal 155 or one like it. Depicted in FIG. 2 is an exemplary pneumatic cylinder 177 from which extends plunger arms 173 a, b. In this embodiment, however, instead of a solid, unitary wedge such as the prior art example discussed above, wedge assembly includes an articulated prong assembly that is pivotally connected to the lateral end of plunger arm 173a. In FIGS. 3 and 4, the articulated prong assembly 223 is presented in greater detail where prongs 225 a, b are shown in an exploded view to be pivotally connected to a mounting plate 227. Mounting plate 227 is pivotally connected to plunger arm 173.

As shown in FIG. 4, prongs 225*a, b* are connected to mounting plate 227 so as to allow prongs to pivot somewhat in either direction from a perpendicular orientation with respect to the mounting plate 227. Likewise, mounting plate 227 is connected to the end of plunger arm 173 in order to allow the mounting plate 227 to pivot in either direction from perpendicular with respect to the plunger arm 173. Accordingly, the assembly allows each prong of the assembly to move independently in the horizontal plane. This independent movement allows each prong to seat more completely in the gaps of the slide rail.

Figure 5:
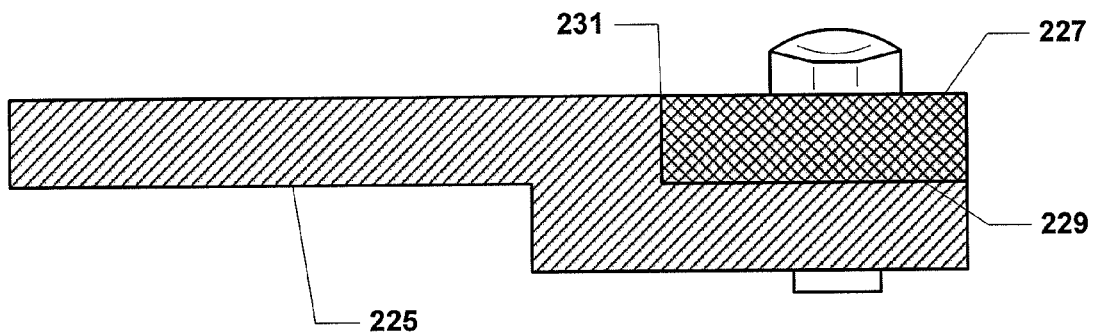
FIG. 5 is a side view of a prong of the wedge assembly according to an embodiment of the present invention.

With reference to FIGS. 3 and 5, prongs may be configured with a ledge portion 229*a, b* which receives the mounting plate 227. When assembled, the mounting plate 227 loosely abuts the wall 231 defining the ledge portion 229. This allows the prongs to be mounted lower, keeping them in line with the plunger 173 extending from the pneumatic cylinder 177, which in turn allows the cylinder 177 to be mounted as low as possible in the pedestal.

Figure 6:
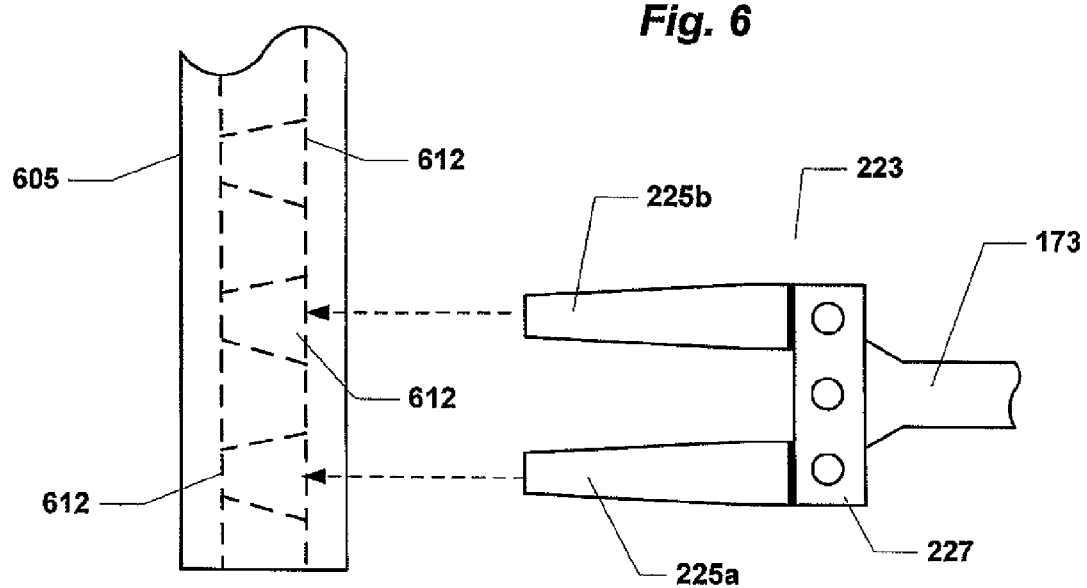
FIG. 6 illustrates engagement of exemplary wedge assembly prongs into gaps of an exemplary slide rail.

In addition, prongs may be tapered toward their respective lateral ends to allow them to seat deeper into the slide rail gaps. FIG. 6 presents an exemplary slide rail 605 in which gaps 612 are tapered from the inboard side to the outboard side. The advantages of this feature are that typical fifth wheel slide mechanisms which are disposed between the parallel mounted slide rails, i.e., toward the inboard sides, include the laterally extendable prong members 225*a, b* which insert into the gaps 612, and are locked in the extended position, preventing sliding of the fifth wheel. Over time, wear on the prongs 225*a,b* results in a narrowing of the prong member portion that is inserted in the gaps 612. Tapering the gaps 612, as shown in FIG. 6, means that over time, more of the prong member 225 may be inserted into the gap 612 and maintain secure positioning of the fifth wheel.

Figure 7:
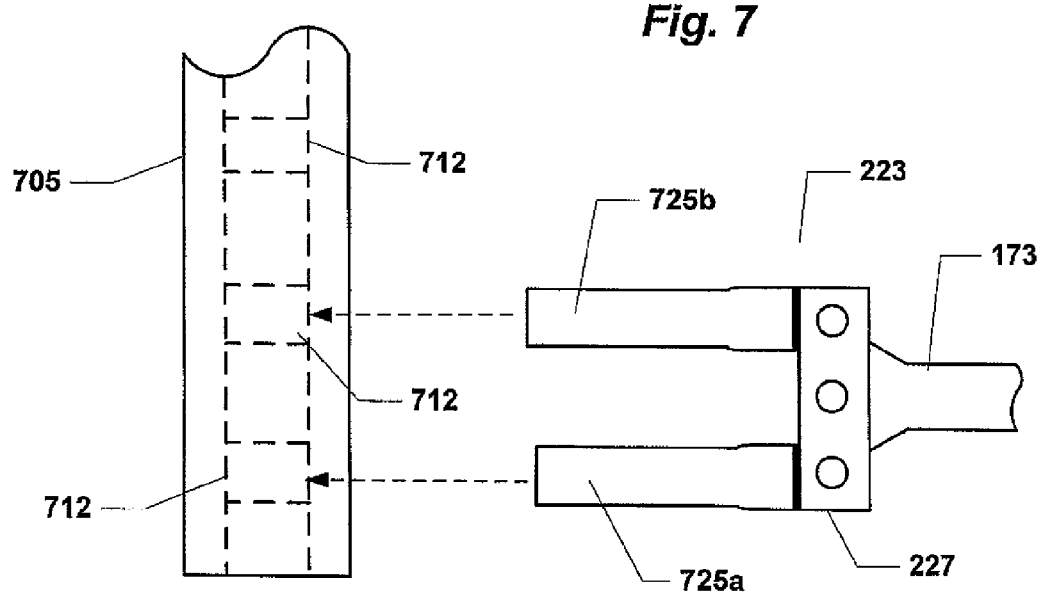
FIG. 7 illustrates engagement of another embodiment of wedge assembly prongs.

FIG. 7 illustrates a further embodiment wherein exemplary slide rail 705 includes gaps 712 with parallel walls. Prong members 725 *a, b* are configured to have parallel sides to fit within the gaps 712. This advantageously provides support for the wedge assembly in the forward and rearward direction in the lateral area.

As described above and shown in the associated drawings, the present invention comprises an articulated fifth wheel selective adjustment means. While particular embodiments of the invention have been described, it will be understood, however, that the invention is not limited thereto, since modifications may be made by those skilled in the art, particularly in light of the foregoing teachings. It is, therefore, contemplated by the following claims to cover any such modifications that incorporate those features or those improvements that embody the spirit and scope of the present invention.

What is claimed is:

1. In a fifth wheel assembly configured for selective adjustment in longitudinal position relative to a truck body on which the fifth wheel assembly is mounted, the assembly having a pedestal slidably engaging slide rails disposed in parallel to a longitudinal axis of said truck body, a selective adjustment apparatus carried within the pedestal, the selective adjustment apparatus comprising:
    a mounting plate pivotally connected to a plunger arm configured for selective extension and withdrawal from the pedestal, and having first and second ends;
    first and second prongs having interior ends disposed toward the pedestal that are pivotally connected to said first and second mounting plate ends.

2. The selective adjustment apparatus of claim 1, wherein said first and second prongs have tapered exterior ends.

3. The selective adjustment means of claim 2, wherein each said interior end of first and second prongs further comprises a ledge for receiving said mounting plate.

4. The selective adjustment means of claim 1, wherein said first and second prongs have parallel exterior ends.

5. The selective adjustment means of claim 4, wherein each said interior end of first and second prongs further comprises a ledge for receiving said mounting plate.

* * * * *